R. E. HELLMUND.
SYSTEM OF CONTROL.
APPLICATION FILED OCT. 7, 1915.
1,308,068.
Patented July 1, 1919.
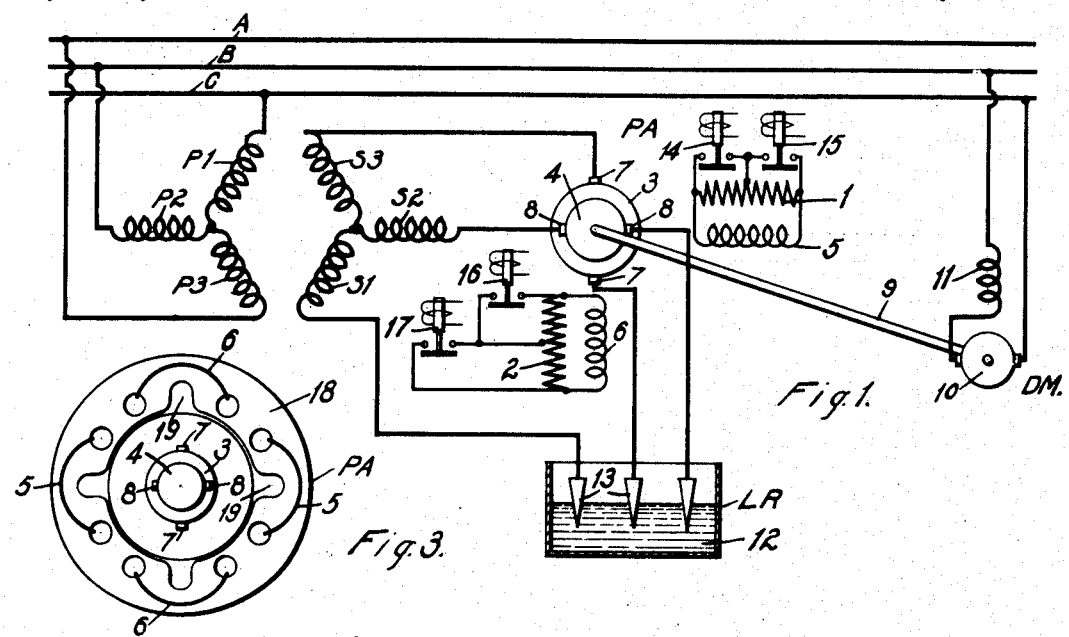
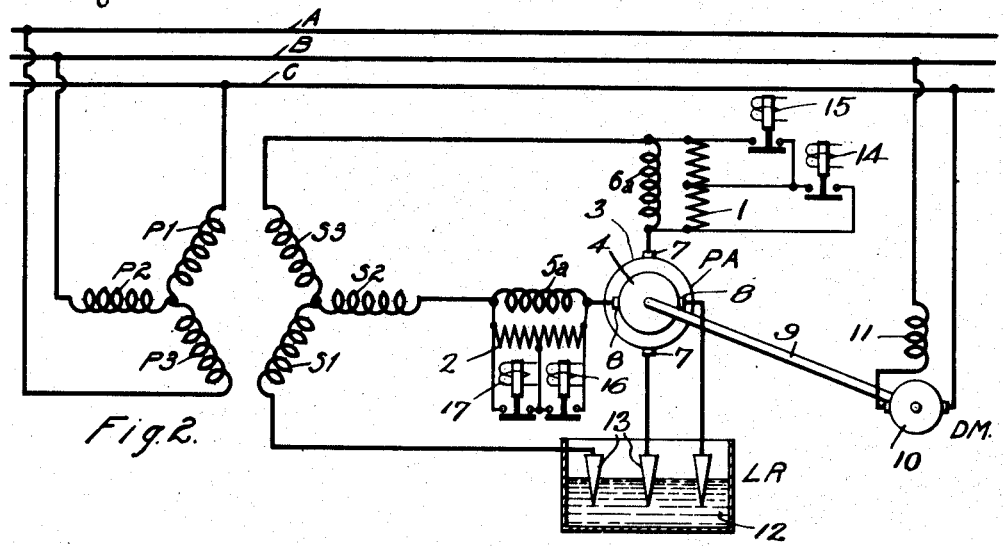
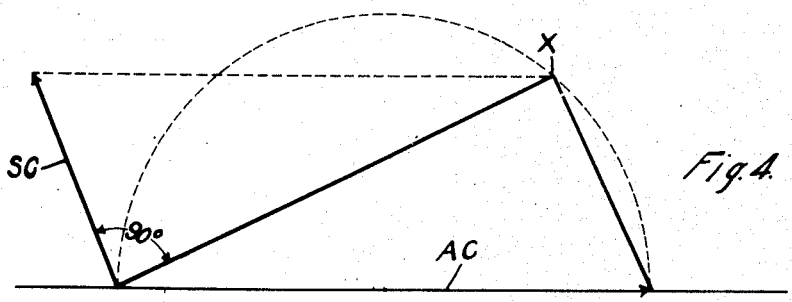
WITNESSES:
R. J. Fitzgerald.
W. R. Coley.
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,308,068.     Specification of Letters Patent.     Patented July 1, 1919.

Application filed October 7, 1915. Serial No. 54,539.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to dynamo-electric machines and systems of control therefor, and it has special reference to phase-advancing means for effecting power-factor regulation of polyphase induction motors or systems of distribution.

The object of my invention is to provide a system of the above-indicated character which shall embody a phase-advancer that is connected between the secondary windings of the induction motor to be regulated and a polyphase interconnected rheostatic device by means of which the motor operation is governed, whereby the phase advancer may be operated concurrently with the governing rheostat to compensate for the varying loads and accompanying power-factors of the induction motor.

More specifically stated, it is the object of my invention to provide a system of the class referred to that shall embody improvements over the system disclosed in my copending application, Serial No. 49,755, filed September 9, 1915.

In the prior art, as represented by my above-identified co-pending application, a phase-advancing dynamo-electric machine was provided with a plurality of independent armature phase windings that were connected in respective series relation with a plurality of the secondary phase windings of the induction motor to be regulated. The stator of the phase-advancing machine was provided with a plurality of field-magnet windings disposed in quadrature relation, the one to the other, said windings further being so disposed as to induce various values of energy currents in the armature windings of the phase-advancing machine, to vary the voltage and the power-factor regulation of the induction motor as the load and the slip thereof was changed. Means were provided for short-circuiting the field-magnet windings under predetermined load conditions and for connecting them in series-circuit relation with the respective armature windings under other load conditions.

However, I have discovered that better and smoother voltage and power-factor regulation may be effected, provided the field-magnet windings referred to are introduced into, and excluded from, circuit in a more gradual manner; and, with this end in view, I provide a plurality of suitable translating devices, such as resistors, that are connected in parallel relation to the respective field-magnet windings, and a plurality of switching means for short-circuiting predetermined sections of the translating devices, if desired, under certain load conditions, to gradually vary the effect of the field-magnet windings upon the armature voltages induced in the phase-advancing machine.

Whenever it is desired to effect certain changes in the slip of induction motors, and, at the same time, to introduce a wattless component into the secondary winding thereof for the purpose of power-factor correction, the field excitation of the phase-advancer machine employed may be properly regulated in phase by the use of either double field-magnet windings or distributed windings with movable connections. The invention hereinafter described embodies means for effecting the desired object in a relatively simple and reliable manner.

One well-known way of regulating the voltage of a phase-advancing machine is to vary its speed by means of a suitable driving motor, but such speed variation is not possible in cases where it is desired to drive the phase-advancer by some other auxiliary machine, as, for instance, a phase-converter that is employed in certain types of locomotives for converting single-phase to polyphase energy and which operates at a substantially constant speed. On the other hand, my present invention is adapted to provide the required regulation, even though the phase-advancer operates at a practically steady speed.

In order to better effect the desired power-factor regulation, I employ a phase-advancer machine of the familiar Leblanc type provided with a stator or field-magnet structure having a plurality of commutating notches that respectively correspond to the brush positions of the armature windings, and a plurality of field-magnet windings are wound upon the stator to magnetize a relatively small portion of the polar face area. Consequently, whenever the field windings are short-circuited, the flux set up by the windings is damped out to a predetermined extent, or, in other words, the field excitation is materially weakened.

In the accompanying drawing, Figure 1 is a diagrammatic view of a system of control embodying my invention; Fig. 2 is a similar view of a modification thereof; Fig. 3 is a diagrammatic view of the preferred construction of the phase-advancing machine that is employed in my invention; Fig. 4 is a vector diagram indicating the relation of the electromotive forces that are developed in my phase-advancing machine; and Fig. 5 is a sequence chart of well-known form for indicating the operation of the switches that are illustrated in Fig. 1 and Fig. 2.

Referring to the drawing, the system shown comprises a plurality of alternating-current supply-circuit conductors A, B and C; an induction motor having a plurality of primary star-connected three-phase windings $P^1$, $P^2$ and $P^3$ and a plurality of secondary similarly connected phase windings $S^1$, $S^2$ and $S^3$; a phase-advancer PA for regulating the power-factor of the induction motor; a polyphase interconnected resistor LR that is employed in connection with the secondary induction-motor windings and the phase-advancer; a suitable driving motor DM for the phase-advancer; and a plurality of translating devices 1 and 2 that are employed in connection with my invention in a manner to be described.

While I have illustrated my invention in connection with a star-connected induction motor, it will be understood that the invention is equally applicable to the delta-connected type of motors.

The phase advancer PA is of well-known type, having a plurality of independent armature windings (not shown) that are connected, in the usual manner, with commutators 3 and 4, respectively, and a plurality of stationary field-magnet windings 5 and 6 that are disposed in quadrature relation, the one to the other, and that respectively form closed local circuits with the resistors 1 and 2. The armature winding that is connected with the commutator 3 is provided with a pair of oppositely-disposed brushes 7, while the other armature winding that is connected to the commutator 4 is provided with a pair of brushes 8 that are disposed in quadrature relation to the other brushes 7.

The secondary winding $S^3$ of the induction motor is connected in series relation with the armature having the brushes 7 to one terminal of the polyphase interconnected resistor LR; a second secondary winding $S^2$ is connected through the brushes 8 to another terminal of the resistor LR, while the remaining secondary phase winding $S^1$ is connected directly to the remaining terminal of the resistor. The field-magnet winding 5 is disposed in quadrature relation to the brushes 7 and is adapted to modify the corrective rotational voltage in the corresponding armature winding by reason of the rotational electromotive force between the field winding 5 and the armature winding in question. Similarly, the field winding 6 is disposed in quadrature relation to the brushes 8 and is adapted to modify the rotational corrective quadrature component of electromotive force in the corresponding armature winding, as set forth more fully later.

The auxiliary driving motor DM may be coupled to the phase advancer PA in any suitable manner, as by a shaft 9, and is shown as comprising an armature winding 10 and a series-connected field-magnet winding 11. The driving motor may be conveniently connected across the phase conductors B and C of the polyphase supply circuit. It will be understood that any other type of driving motor may be employed, if desired.

The polyphase interconnected resistor is here shown as comprising a liquid rheostat LR of a familiar type having a single containing case 12 and a plurality of suitably spaced terminals or electrode plates 13 that are adapted for variable immersion in a body of suitable electrolyte.

The translating device or resistor 1 is connected in parallel relation to the field-magnet winding 5 and is adapted to have its sections short-circuited by switches 14 and 15, respectively. In a similar manner, the resistor $R^2$ is connected in parallel relation to the field-magnet winding 6, and a plurality of switches 16 and 17 are adapted to short-circuit predetermined sections of the resistor.

The switches just mentioned may be of any form familiar in the art and the operation thereof may be conveniently governed through the agency of a master controller (not shown) which is designed and adapted to effect the closure of the switches in accordance with the sequence chart shown in Fig. 5, in order to establish proper circuit relations of the system for different operating conditions thereof. It will be understood that, if desired, a main-circuit controller may be provided having coöperating contact segments and control fingers for performing the same functions as the switches 14 to 17, inclusive, and, inasmuch as those skilled in the art will find no difficulty in understanding the operation of my invention, it has not been deemed necessary to illustrate and describe in detail any form of controller for effecting the desired circuit connections.

Referring now to Fig. 3, the structure shown comprises the armature windings (not shown) and the corresponding commutators 3 and 4, and a suitable field-magnet structure or stator 18 that is disposed around the armature windings and is provided with a plurality of commutating notches 19 that respectively correspond to the positions of the several brushes 7 and 8, in accordance with a familiar practice. The field-magnet winding 5 is shown as comprising two oppositely-disposed parts that respectively surround the commutating notches 19 that are disposed in alinement with the brushes 8. Similarly, the field-magnet winding 6 comprises two portions that are diametrically oppositely-disposed to respectively inclose the commutating notches 19 that are alined with the brushes 7. In this way, the independent field-magnet windings respectively surround, and are adapted to magnetize, only a relatively small portion of the total polar face area of the stator. Consequently, upon short-circuiting the field-magnet windings, the flux set up by them will be damped out to a relatively great extent, and the effective field excitation will be materially weakened. On the other hand, if the short-circuiting switches are opened, the field-magnet windings will exert their maximum strength, and an intermediate step may be obtained by closing only one pair of the switches that are associated with the respective field-magnet windings.

Still another step might be obtained, if desired, by connecting the field-magnet windings to cause their ampere-turns to oppose the ampere-turns of the armature, but in the majority of cases, the system illustrated in the figure will be sufficient for the desired purpose. It will be understood that any suitable number of resistor short-circuiting switches may be provided.

It is a well-known fact that, in the illustrated type of phase-advancer, a relatively weak field excitation is required, under normal or full-load conditions, while a relatively heavy field excitation is necessary when the induction motor is operating under light-load conditions, also that, when a relatively low resistance is included in the secondary circuit of the induction motor accompanied by a relatively low secondary frequency, a light field excitation for the phase-advancer is required, whereas, in case a relatively heavy resistance is connected in the secondary circuit, accompanied by relatively high secondary frequency, a correspondingly heavy field excitation for the phase-advancer is necessary. For intermediate loads or secondary frequencies, it will be understood that the phase-advancer field excitation should vary proportionately, in accordance with the principles mentioned.

It will thus be noted that the field windings 5 and 6 serve as the secondary members of transformers, the primary windings thereof being the armature windings having the relatively coaxially disposed brushes. Thus, the armature winding associated with the brushes 8—8 acts as the primary member of a transformer, the secondary member of which is the field winding 5. The phase-displacing or corrective electromotive force between the brushes 7—7 is the rotational electromotive force established by cutting the transformer flux of said transformer provided by the winding associated with the brushes 8—8 and the winding 5. The resistor 5 acts as a load upon the secondary of said transformer, the flux relations and vector diagram, when the resistor is in circuit, being substantially those of the ordinary transformer, whereas the flux relations and vector diagram, when the resistor 1 is short circuited, are substantially those of the current transformer.

Thus in the vector diagram of Fig. 4, the horizontal vector AC may represent the magnetization by the current in one of the armature windings of the phase-advancing machine PA as, for example, that associated with the brushes 8—8. Neglecting the relatively small influence of leakage reactance, the voltage induced in the stator winding, and, consequently, the current flowing therein, has a phase relation at right angles to the resulting field and may be represented by the vector SC. As a result, the point X representing the resultant field referred to must travel along the arc of a circle, as indicated. It is evident, therefore, that, by regulating the resistors 1 and 2, we can change the magnitude and direction of the vector SC and, consequently, obtain various phase angles for the resultant field and finally for the corrective voltage that is induced in the armature of the phase-advancer.

The operation of my invention, taken in connection with the sequence chart of Fig. 5, may be briefly stated as follows: Upon starting up the induction motor, when a relatively high resistance is introduced into the secondary winding circuit by the liquid rheostat LR, the slip frequency is relatively high and, in order to avoid excessive sparking, the field excitation of the phase-advancer PA is weakened by closing all of the switches 14 to 17, inclusive, to complete the short-circuiting of the field-magnet windings 5 and 6. As the motor speeds up and the resistance of the liquid rheostat LR is gradually decreased, the slip frequency correspondingly decreases, and it is permissible to strengthen the field excitation of the phase-advancer.

To effect the desired increase of field excitation, the master controller or other governing device that is employed may be manipulated to open the switches 14 and 16, as indicated by position b of Fig. 5. When the liquid rheostat LR is practically short-circuited so that the induction motors are running under normal speed and load conditions, the field excitation of the phase-advancer may be still further increased by opening the switches 15 and 17, as indicated by position c of the sequence chart. In this case, the voltage induced in the closed local circuits, respectively including the field-magnet windings 5 and 6, in turn develops, in the quadrature-related armature winding of the phase advancer, an energy component and increased voltage that suitably compensate for the slip of the induction motor, while the wattless currents induced in the phase-advancer armature windings, in accordance with well-known principles, serve to regulate the power-factor of the motor and of the connected supply circuit.

Referring now to Fig. 2, the only difference from the system illustrated in Fig. 1 resides in the insertion of the field-magnet windings 5ª and 6ª, that respectively correspond to the field windings 5 and 6 of Fig. 1, in series-circuit relation with the armature windings of the phase-advancer that are connected with the commutators 4 and 3, respectively.

It will be understood that the operation of the field-magnet windings 5ª and 6ª in connection with the quadrature-related armature windings of the phase-advancer PA is very similar to that described in Fig. 1, and no further discussion of the operation thereof is deemed necessary.

In general, it may be stated that the phase-advancer armature windings in the system illustrated in Fig. 1 are exclusively inductively related to the field-winding circuits, while, in the system shown in Fig. 2, the respective armature-winding currents actually traverse the corresponding field-magnet windings or, in other words, the armature windings are conductively related to the field-winding circuits.

I do not wish to be restricted to the specific structural details or arrangement of parts or circuit connections herein set forth, as various modifications thereof may be made without departing from the spirit and scope of my invention. I desire, therefore, that only such limitations shall be imposed as are indicated in the appended claims.

I claim as my invention:

1. In polyphase, phase-advancing apparatus embodying conductively independent phase-windings, a secondary winding inductively interlinked with one of said phase-windings, an adjustable impedance device connected across the terminals of said secondary winding, whereby the phase of the interlinking transformer flux may be varied, and means for inducing a corrective electromotive force in another phase winding whose phase varies with the phase of said transformer flux.

2. In polyphase, phase-advancing apparatus embodying conductively independent phase-windings, a secondary winding inductively interlinked with one of said phase-windings, and an adjustable impedance device connected across the terminals of said secondary winding, whereby the phase of the interlinking transformer flux may be varied, another of said phase-windings being so disposed as to cut said transformer flux, whereby a corrective electromotive force is generated therein which varies in magnitude and phase with said flux.

3. In a polyphase, phase-displacing dynamo-electric machine, an armature provided with a plurality of distinct windings and with commutating means therefor including a plurality of brush sets mounted in different commutating planes, a connection from each of a plurality of phases of a polyphase system to each of said brush sets, respectively, a field winding substantially in line, electrically, with each of said brush sets, whereby a transformer action exists between each field winding and the armature coils included between the coaxially disposed brushes, means for driving said dynamo-electric machine, and means for providing a closed current path of variable resistance between the terminals of each field winding, respectively, whereby the phase of the transformer flux interlinked with each field winding may be varied and an electromotive force of adjustable phase displacement induced in the other phases connected to said machine.

4. The combination with a three-phase system, of a phase-displacing dynamo-electric machine comprising an armature provided with a plurality of distinct windings and with commutating means therefor including two brush sets mounted in respective space quadrature, connections for including said brush sets in two phases of said system, respectively, a field winding electrically in line with each of said brush sets, and means for connecting a shunt path of adjustable resistance across each of said field windings, whereby the phase of the transformer flux interlinked with each of said field windings may be varied and thereby the phase of the rotational electromotive force induced in the phase connected to the other brush set.

5. A phase-advancer comprising an armature having a plurality of independent phase windings, a set of brushes for each winding, a field-magnet structure having a plurality of commutating notches respectively corresponding to the several brushes, and a plurality of field-magnet windings severally adapted to magnetize relatively small portions, only, of the remaining polar face area of the field-magnet structure.

6. A phase-shifting dynamo-electric machine comprising an armature, commutating apparatus embodying a plurality of mutually displaced brush-sets, a stator structure provided with a plurality of commutating notches in electrical alinement with said brush-sets, respectively, and a plurality of field windings mounted upon said stator structure and in proximity to said notches, respectively, each of said field windings being operative upon only a restricted portion of the polar face of said stator member on each side of the associated notch.

In testimony whereof, I have hereunto subscribed my name this 30th day of Sept., 1915.

RUDOLF E. HELLMUND.